(12) United States Patent
Aikawa et al.

(10) Patent No.: US 6,876,803 B2
(45) Date of Patent: Apr. 5, 2005

(54) OPTICAL TRANSMISSION SYSTEM

(75) Inventors: Kazuhiko Aikawa, Sakura (JP); Shogo Shimizu, Sakura (JP); Masakazu Nakayama, Sakura (JP); Kuniharu Himeno, Sakura (JP)

(73) Assignee: Fujikura Ltd., Tokyo (JP)

( * ) Notice: Subject to any disclaimer, the term of this patent is extended or adjusted under 35 U.S.C. 154(b) by 158 days.

(21) Appl. No.: 10/245,661

(22) Filed: Sep. 17, 2002

(65) Prior Publication Data

US 2003/0095766 A1 May 22, 2003

(30) Foreign Application Priority Data

Sep. 28, 2001 (JP) ...................................... P2001-299582

(51) Int. Cl.⁷ ................................................ G02B 6/16
(52) U.S. Cl. ........................................ 385/123; 385/24
(58) Field of Search .......................... 385/24, 123, 124, 385/126, 127

(56) References Cited

U.S. PATENT DOCUMENTS

| | | | |
|---|---|---|---|
| 6,263,138 B1 * | 7/2001 | Sillard et al. ............... | 385/123 |
| 6,324,317 B1 * | 11/2001 | Tanaka et al. ................ | 385/24 |
| 6,584,262 B1 * | 6/2003 | Pilipetskii et al. .......... | 385/123 |
| 6,594,428 B1 * | 7/2003 | Tanaka et al. .............. | 385/123 |
| 6,618,532 B1 * | 9/2003 | Sasaoka et al. ............. | 385/123 |
| 2002/0097969 A1 * | 7/2002 | Aikawa et al. ............. | 385/123 |
| 2002/0159119 A1 * | 10/2002 | Fries et al. ................. | 359/161 |
| 2002/0181907 A1 * | 12/2002 | Bickham et al. ............ | 385/123 |

FOREIGN PATENT DOCUMENTS

| | | | |
|---|---|---|---|
| JP | 2001-318259 | 11/2001 | ............ G02B/6/16 |
| JP | 2001-337245 | 12/2001 | ............ G02B/6/22 |
| JP | 2002-055251 | 2/2002 | ............ G02B/6/22 |
| JP | 2002-071996 | 3/2002 | ............ G02B/6/22 |
| JP | 2002-098853 | 4/2002 | ............ G02B/6/22 |

OTHER PUBLICATIONS

Suzuki et al., "Large–effective–area dispersion compensating fibers for dispersion accommodation both in the C and L band", OECC' OO, Technical Digest, 14C4–4, pp. 554–555, 2000.

* cited by examiner

*Primary Examiner*—Ellen E. Kim
(74) *Attorney, Agent, or Firm*—Darby & Darby (57) ABSTRACT

The present invention provides an optical transmission system that enables high-speed transmission of 40 Gb/s with low residual dispersion while maintaining the yield of a dispersion compensating fiber. In the present invention, the dispersion compensating fiber is connected to each span of an optical fiber for transmission. One set of an optical transmission path is formed by this optical fiber for transmission and the dispersion compensating fiber, and this one set of optical transmission path is connected in multiple stages and connected to a transmitter and a receiver. By setting the conditions of dispersion compensation in each span comparatively leniently, managing the residual dispersion of each transmission span, and suitably arranging each transmission span, an optical transmission system is composed in which adequate dispersion compensation is performed over the entire optical transmission path.

26 Claims, 4 Drawing Sheets

OPTICAL TRANSMISSION SYSTEM

BACKGROUND OF THE INVENTION

1. Field of the Invention

The present invention relates to an optical transmission system that reduces residual dispersion and enables high bit-rate transmissions, in particular to methods employing dispersion compensating fibers.

2. Description of the Related Art

Due to the practical application of erbium-doped optical fiber amplifiers, ultra-long distance, non-regenerating relays and other optical transmission systems using optical amplifiers have already been commercialized in the C-band. In addition, accompanying increases in communication capacity, the development of wavelength division multiplexing (WDM) transmission is proceeding at a rapid pace, and systems have already been commercialized for several optical transmission paths. In the future, although even greater wavelength multiplexing is expected to increase by using broader band and reducing the wavelength interval, the transmission speed per wavelength is also expected to increase.

In order to employ WDM transmission system, it is important that the gain difference caused by the erbium-doped optical fiber amplifier, including the transmission loss of the optical fiber for transmission, be minimized at the wavelength band used, and that the wavelength dispersion be somewhat large at an intermediate point in transmission, and be somewhat small over the entire transmission band with respect to the overall transmission system.

In addition, in recent long-distance systems, the number of multiplexed wavelengths has increased rapidly, and due to the rapid increase in the optical power propagating through the optical fibers, technology for suppression of nonlinearity is essential. The magnitude of this nonlinearity is represented with the following formula:

$$n_2/Aeff$$

where, $n_2$ represents the non-linear refractive index of the optical fiber, and Aeff represents the effective area of the optical fiber. Although it is necessary to either reduce $n_2$ or increase Aeff in order to reduce nonlinearity, since $n_2$ is value that is characteristic to the material, it is difficult to lower this value significantly in quartz-based optical fibers. Consequently, the emphasis of current development of suppression of nonlinearity is focused on increasing Aeff.

At present, 1.3 μm band optimized, single-mode optical fiber networks are spread throughout the world. When transmission at 1.55 μm is carried out using this optical fiber network, wavelength dispersion of about +17 ps/nm/km occurs. Consequently, when signals are transmitted using this optical fiber, transmission characteristics deteriorate considerably due to the effects of wavelength dispersion.

Consequently, development has proceeded on dispersion compensating fibers in order to compensate for this wavelength dispersion, and optical fibers of this type have already been commercialized. This dispersion compensating fiber has considerable negative dispersion at operating wavelength band, and by connecting suitable length of dispersion compensating fiber and optical fiber for transmission, the positive dispersion generated with single-mode optical fiber for transmission can be compensated. Although the residual dispersion impairs high-speed transmission, high-speed communication is possible by compensating for accumulated dispersion in this manner.

The demand for dispersion compensating fiber modules that compensate the dispersion slope and wavelength dispersion of optical transmission paths using 1.3 μm band optimized, single-mode optical fibers is growing rapidly. These modules can be manufactured by technology such as that of the following inventions previously filed by the authors and in academic reports and so forth.

Examples of patent applications include Japanese Unexamined Patent Application, First Publication Nos. 2001-318259, 2001-337245, 2002-98853, 2002-55251, and 2002-71996, while embodiments of academic publications include "Large-effective-area dispersion compensating fibers for dispersion accommodation both in the C and L band", OECC' 00, Technical Digest, 14C4-4, pp. 554–555, 2000.

Figure 3:
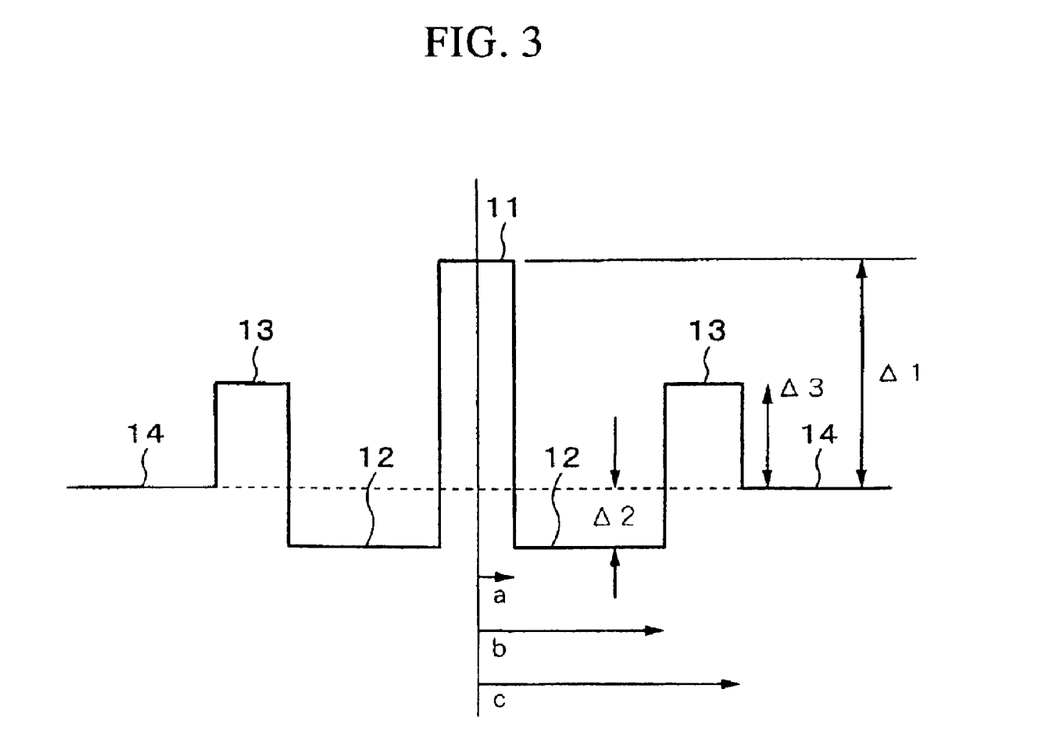
FIG. 3 is a drawing showing the refractive index profile of a dispersion compensating fiber used in the optical transmission system of the present invention.

The form of the refractive profile of dispersion compensating fibers is shown in FIG. 3, and by suitably setting the outer diameter ratio and refractive index of each layer, low nonlinearity can be maintained while increasing effective area.

Figure 4:
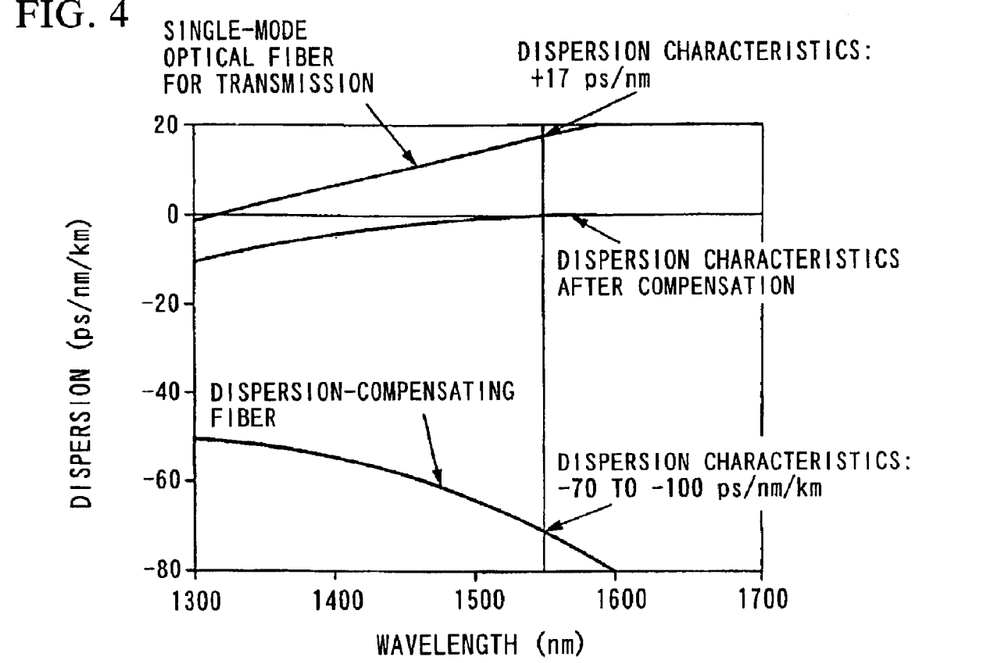
FIG. 4 is a drawing depicting compensation of the dispersion characteristics of a single-mode optical fiber for transmission with a dispersion compensating fiber.

By using these technologies, the accumulated dispersion of a transmission path can be compensated over a wide wavelength range as shown in FIG. 4.

Figure 5:
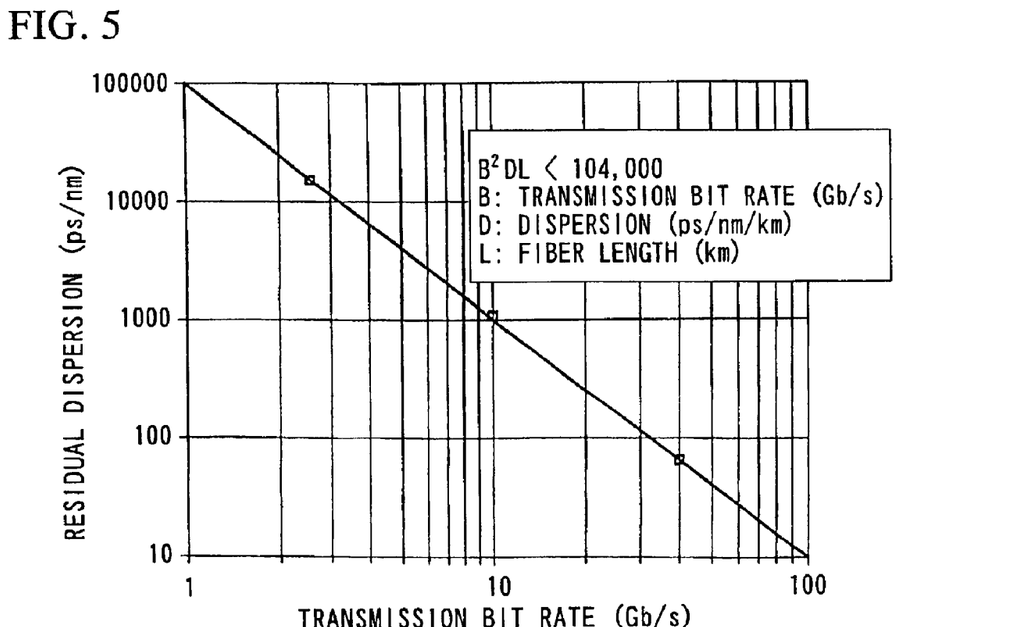
FIG. 5 is a drawing showing the relationship between transmission bit rate and residual dispersion of the transmission path.

However, since transmission speed is restricted by the accumulated dispersion of the optical transmission path, there is a growing demand for dispersion-slope and dispersion compensating fiber modules capable of compensating dispersion over a wide wavelength band instead of a single wavelength of the operating wavelength band for use as dispersion compensating fiber modules. Here, the dispersion slope compensation ratio is the ratio of the dispersion slope of the dispersion compensating fiber to the dispersion slope of the single-mode optical fiber for transmission divided by the ratio of the dispersion value of the dispersion compensating fiber to the dispersion value of the single-mode optical fiber for transmission. The relationship between accumulated dispersion and transmission speed is shown in FIG. 5.

Although transmission distance is restricted by the polarization dispersion and transmission loss of the transmission path, the transmission distance of a 1.3 μm band optimized, single-mode optical fiber is roughly 400 km in consideration of the loss of the dispersion compensating fiber module and so forth. According to FIG. 5, in order to perform high-speed transmission at 40 Gb/s, it is necessary that residual dispersion be ±65 ps/nm or less. In order to achieve this high-speed transmission, the dispersion of the dispersion compensating fiber module is required be accurately matched to the residual dispersion that has accumulated in the transmission path so as to be able to compensate that dispersion, and the dispersion slope compensation ratio must also be nearly 100%.

Although the dispersion-slope and dispersion compensating fibers used in dispersion compensating fiber modules have been able to obtain a dispersion slope compensation ratio of nearly 100% due to advances in refractive index profile control technology, due to the extremely high sensitivity of the dispersion slope compensation ratio relative to changes in the refractive index profile, these optical fibers have a certain degree of dispersion slope compensation ratio when mass produced.

For example, in order for a 1.3 μm band optimized, single-mode optical fiber that is the target of dispersion compensation to be compensated for dispersion in a wavelength band of 1530–1570 nm, although the dispersion error can be held to within ±1.0% by finely adjusting the required amount of dispersion at 1550 nm, which is the central wavelength of this wavelength band, and the dispersion slope compensation ratio can be made to be 100±10% by selecting a dispersion compensating fiber, when a module is attempted to be manufactured using such a high-performance dispersion compensating fiber, it causes a decrease in the yield of optical fiber and a corresponding increase in costs.

In addition, even if such a high-performance dispersion compensating fiber module is used, if there is bias in the dispersion slope compensation ratio of this dispersion compensating fiber within a span of about 400 km, residual dispersion ends up exceeding ±65 ps/nm at the wavelengths on both ends of the operating wavelength range. For example, FIG. 6 depicts the residual dispersion following compensation when wavelength dispersion of a transmission path having a transmission distance of about 400 km was compensated about every 80 km using a dispersion compensating fiber having a dispersion error at the central wavelength of 0.7% and dispersion slope compensation ratio of 100±10%.

Figure 6:
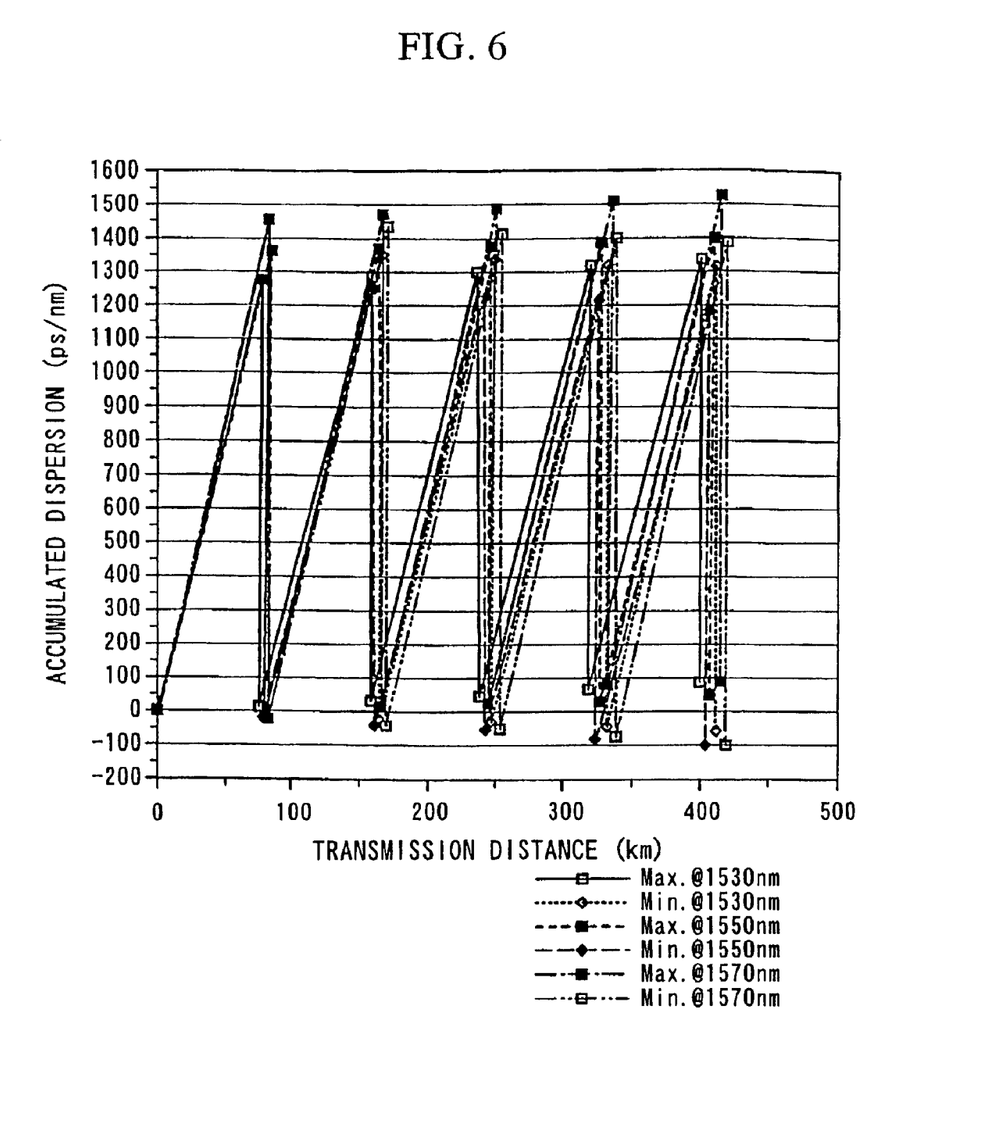
FIG. 6 is a drawing depicting residual dispersion when the dispersion of an optical transmission path of about 400 km in length is compensated with optical fiber modules about every 80 km in the case of bias present in the dispersion slope compensation ratio of the optical fiber modules.

As can be understood from FIG. 6, the maximum value of residual dispersion following compensation was ±95 ps/nm at 1530 nm and 1570 nm corresponding to the wavelengths at both ends of the operating wavelength range. Consequently, in the case of high-speed transmission of 40 Gb/s or more, the transmission characteristics of the optical transmission system deteriorate according to the characteristics and arrangement of the dispersion compensating fiber.

SUMMARY OF THE INVENTION

The present invention is provided to solve the above problems, and the object of the present invention is to provide an optical transmission system that enables high-speed transmission of 40 Gb/s with low residual dispersion while maintaining the yield of the dispersion compensating fiber.

In order to solve the above problems, a first aspect of the invention is an optical transmission system having an optical transmission path comprising the connecting of a plurality, n, of sets of transmission path spans consisting of an optical fiber for transmission having positive wavelength dispersion and positive dispersion slope, and a dispersion compensating fiber having negative wavelength dispersion and negative dispersion slope, in an operating wavelength band; wherein, the dispersion slope and optical fiber length of the optical fiber for transmission and the dispersion compensating fiber satisfy following equations (1), (2) and (3) for each transmission path span i, and satisfy following equations (4) and (5) for the overall optical transmission path.

$$a \leq \frac{(St_i Lt_i) + (Sd_i Ld_i)}{(Lt_i + Ld_i)} \leq b \tag{1}$$

$$a \neq 0 \tag{2}$$

$$b \neq 0 \tag{3}$$

$$c \leq \frac{\sum_{i=1}^{n} St_i Lt_i + \sum_{i=1}^{n} Sd_i Ld_i}{\sum_{i=1}^{n} (Lt_i + Ld_i)} \leq d \tag{4}$$

$$c > a, \; d < b \tag{5}$$

In equations (1), (2), (3), (4) and (5), $St_i$ and $Lt_i$ represent the dispersion slope and optical fiber length of the optical fiber for transmission in each transmission path span, $Sd_i$ and $Ld_i$ represent the dispersion slope and optical fiber length of the dispersion compensating fiber in each transmission path span, and a, b, c and d are constants that define the residual dispersion slope.

In this manner, by setting the conditions of dispersion compensation in each transmission path span comparatively leniently, and using the combination of a plurality of these dispersion compensating fibers, adequate dispersion compensation can be performed for the overall optical transmission path, thereby making it possible to realize an optical transmission system that enables high-speed transmission of 40 Gb/s or more with low residual dispersion while maintaining yield.

A second aspect of the present invention is the optical transmission system according to the first aspect wherein, the value of following equation (6) for the transmission path span is formed by the combination of a transmission path span adopting a positive value and a transmission path span adopting a negative value.

$$\frac{(St_i \cdot Lt_i) + (Sd_i \cdot Ld_i)}{(Lt_i + Ld_i)} \tag{6}$$

In equation (6), $St_i$ and $Lt_i$ represent the dispersion slope and optical fiber length of the optical fiber for transmission in each transmission path span, and $Sd_i$ and $Ld_i$ represent the dispersion slope and optical fiber length of the dispersion compensating fiber in each transmission path span.

A third aspect of the present invention is the optical transmission system according to the first aspect wherein, the value of the above equation (6) for the transmission path span is formed by alternately connecting a transmission path span that adopts a positive value and a transmission path span that adopts a negative value.

A fourth aspect of the present invention is the optical transmission system according to the first aspect and having an optical transmission path comprising the connecting of at least two or more sets of transmission path spans consisting of an optical fiber for transmission having positive wavelength dispersion and positive dispersion slope, and a dispersion compensating fiber having negative wavelength dispersion and negative dispersion slope, in an operating wavelength band; wherein, the value of the above equation (6) is formed from at least one transmission path span having a positive value and at least one transmission path span having a negative value.

A fifth aspect of the present invention is the optical transmission system according to any of the first aspect through fourth aspect that satisfies following equations (7) and (8) with respect to bandwidth e of the above operating wavelength band.

$$c \geq -\frac{65}{(e/2) \sum_{i=1}^{n} (Lt_i + Ld_i)} \tag{7}$$

$$d \leq \frac{65}{(e/2) \sum_{i=1}^{n} (Lt_i + Ld_i)} \tag{8}$$

In equations (7) and (8), $Lt_i$ represents the optical fiber length of the optical fiber for transmission in each transmission path span, and $Ld_i$ represents the optical fiber length of the dispersion compensating fiber in each transmission path span.

A sixth aspect of the present invention is the optical transmission system according to any of the first aspect through fifth aspect wherein, the above a and b satisfy the relationship of a≧2c and b≦2d.

A seventh aspect of the present invention is the optical transmission system according to any of the first aspect through sixth aspect wherein, the above dispersion compensating fiber is incorporated as an optical cable.

An eighth aspect of the present invention is the optical transmission system according to any of the first aspect through sixth aspect wherein, the above dispersion compensating fiber is incorporated as an optical fiber module.

A ninth aspect of the present invention is the optical transmission system according to any of the first aspect through sixth aspect wherein, the above dispersion compensating fiber each composes a separate dispersion compensating fiber module, and these dispersion compensating fiber modules are used as a set to satisfy the conditions of the first aspect.

A tenth aspect of the present invention is the optical transmission system according to any of the first aspect through ninth aspect wherein, the operating wavelength band is a wavelength range arbitrarily selected from a wavelength range of 1460 nm to 1530 nm.

An eleventh aspect of the present invention is the optical transmission system according to any of the first aspect through ninth aspect wherein, the operating wavelength band is a wavelength range arbitrarily selected from a wavelength range of 1530 nm to 1565 nm.

A twelfth aspect of the present invention is the optical transmission system according to any of the first aspect through ninth aspect wherein, the above operating wavelength band is a wavelength range arbitrarily selected from a wavelength range of 1565 nm to 1625 nm.

A thirteenth aspect of the present invention is the optical transmission system according to any of the first aspect through twelfth aspect wherein, the residual dispersion following dispersion compensation in the operating wavelength band is held to within ±65 ps/nm.

A fourteenth aspect of the present invention is the optical transmission system according to any of the first aspect through thirteenth aspect and comprising: a core and a cladding provided on its outer periphery, the core is composed of a central core section having a refractive index at least larger than the refractive index of the cladding, an intermediate core section provided on the outer periphery of this central core section and having a refractive index smaller than the refractive index of the cladding, and a ring core section provided on the outer periphery of this intermediate core section and having a refractive index larger than the refractive index of the cladding; wherein, the radius of the ring core section is from 6 μm to 9 μm, the ratio of the radius of the central core section to the radius of the intermediate core section is from 2.5 to 4.0, and the ratio of the radius of the ring core section to the radius of the intermediate core section is from 1.1 to 2.0, the relative refractive index difference of the central core section with respect to the cladding is from +1.2% to +1.7%, the relative refractive index difference of the intermediate core section with respect to the cladding is from −0.20% to −0.45%, and the relative refractive index difference of the ring core section with respect to the cladding is from +0.2% to +1.1%, and, the effective cross-sectional area in the operating wavelength band selected from 1.460 μm to 1.625 μm is 20 μm² or more, the bending loss in the above operating wavelength band is 20 dB/m or less, the wavelength dispersion in the above operating wavelength band is in the range of −65 ps/nm/km to −100 ps/nm/km, and an optical fiber having a cutoff wavelength capable of single-mode transmission in the above operating wavelength band and in the substantial operating state is used as the dispersion compensating fiber.

DESCRIPTION OF THE PREFERRED EMBODIMENTS

The following provides a detailed explanation of the present invention.

Figure 1:
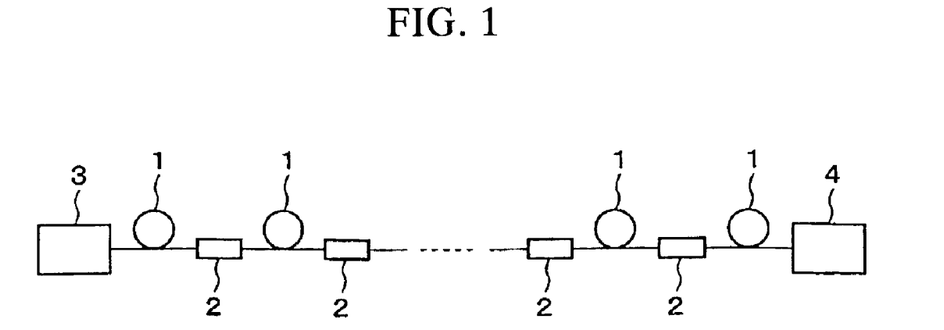
FIG. 1 is a drawing showing a first embodiment of the optical transmission system of the present invention.

A first embodiment of the optical transmission system of the present invention is shown in FIG. 1.

In FIG. 1, reference symbol 1 indicates an optical fiber for transmission, and dispersion compensating fiber 2 is connected to every span of this optical fiber for transmission 1. One set of an optical transmission path span is formed by this optical fiber for transmission 1 and dispersion compensating fiber 2, and the entire optical transmission path is formed by connecting this set of an optical transmission span in multiple stages. Transmitter 3 and receiver 4 are connected by these optical transmission paths to form an optical transmission system.

In this optical transmission path, the dispersion slopes $St_i$ and $Sd_i$ of the optical fiber for transmission 1 and dispersion compensating fiber 2, and lengths $Lt_i$ and $Ld_i$ of the optical fiber for transmission 1 and dispersion compensating fiber 2, satisfy following equations (1), (2) and (3) in each transmission path span, and the dispersion compensating fiber 2 is used so as to satisfy following equations (4) and (5) for the overall optical transmission path. Furthermore, dispersion slope refers to the ratio of the change in wavelength dispersion to the change in wavelength.

$$a \leq \frac{(St_i L t_i) + (Sd_i L d_i)}{(Lt_i + Ld_i)} \leq b \tag{1}$$

$$a \neq 0 \tag{2}$$

$$b \neq 0 \tag{3}$$

$$c \leq \frac{\sum_{i=1}^{n} St_i Lt_i + \sum_{i=1}^{n} Sd_i Ld_i}{\sum_{i=1}^{n} (Lt_i + Ld_i)} \leq d \quad (4)$$

$$c > a, \; d < b \quad (5)$$

In the optical transmission system of this embodiment, although positive wavelength dispersion is generated by the optical fiber for transmission 1 having positive wavelength dispersion and positive dispersion slope during optical transmission, since the dispersion compensating fiber 2 provided in each transmission path span has negative wavelength dispersion and negative dispersion slope, the positive wavelength dispersion generated by the optical fiber for transmission 1 is compensated by the dispersion compensating fiber 2.

In equation (1), $St_i \times Lt_i$ is the dispersion slope over the span length in transmission path span i of the optical fiber for transmission 1 having positive wavelength dispersion and positive dispersion slope, and has a positive value. In contrast, $Sd_i \times Ld_i$ is the dispersion slope over the span length in transmission path span i of the dispersion compensating fiber 2 having negative wavelength dispersion and negative dispersion slope, and has a negative value.

Thus, the numerator of equation (1) in the form of $St_i \times Lt_i + Sd_i \times Ld_i$ is the dispersion slope following dispersion compensation in transmission path span i composed of the optical fiber for transmission 1 and dispersion compensating fiber 2, and may have a positive value, negative value of a value of zero depending on the degree of dispersion compensation.

The dispersion slope following dispersion compensation per optical fiber length of transmission path span i can be determined by dividing this by $Lt_i + Ld_i$, which is the sum of the length of the optical fiber for transmission and the length of the dispersion compensating fiber in transmission path span i. Constants a and b are values of the dispersion slope following dispersion compensation per optical fiber length.

On the other hand, in equation (4), $\Sigma St_i Lt_i$ is the dispersion slope over the optical fiber length in the entire transmission path of the optical fiber for transmission 1 having positive wavelength dispersion and positive dispersion slope, and has a positive value. In contrast, $\Sigma Sd_i Ld_i$ is the dispersion slope over the optical fiber length in the entire transmission path of the dispersion compensating fiber 2 having negative wavelength dispersion and negative dispersion slope, and has a negative value.

Thus, the numerator of equation (4) in the form of $\Sigma St_i Lt_i + \Sigma Sd_i Ld_i$ is the dispersion slope following dispersion compensation in the entire transmission path composed of the optical fiber for transmission 1 and dispersion compensating fiber 2, and may have a positive value, negative value or a value of zero depending on the degree of dispersion compensation.

The dispersion slope following dispersion compensation per optical fiber length of the entire transmission path can then be determined by dividing this by $\Sigma(Lt_i + Ld_i)$, which is the sum of the length of the optical fiber for transmission and the length of the dispersion-compensating fiber over the entire transmission path. The constants c and d are the values of dispersion slope following dispersion compensation per optical fiber length of the entire transmission path.

With respect to the dispersion compensation by this dispersion compensating fiber 2, as can be understood from c>a and d<b in equation (5), the conditions of dispersion compensation in each transmission path span indicated in equation (1) are set comparatively leniently, and by using these dispersion compensating fibers 2 by combining a plurality of sets thereof, the conditions of dispersion slope compensation are stricter than equation (1) as shown in equation (4) with respect to the entire optical transmission path, resulting in adequate dispersion compensation being performed over a wide wavelength range.

In the optical transmission system of this embodiment, c and d are preferably set so as to satisfy following equations (7) and (8) with respect to bandwidth e of the operating wavelength band.

$$c \geq -\frac{65}{(e/2)\sum_{i=1}^{n}(Lt_i + Ld_i)} \quad (7)$$

$$d \leq \frac{65}{(e/2)\sum_{i=1}^{n}(Lt_i + Ld_i)} \quad (8)$$

In order to realize an optical transmission system allowing high-speed transmission of 40 Gb/s or more, as was previously mentioned, it is necessary to suppress the residual dispersion following dispersion compensation to within 65 ps/nm over the entire operating wavelength band. As a result of performing dispersion compensation so that wavelength dispersion at the central wavelength of the operating wavelength band is zero, the dispersion slope from the central wavelength to the shortest wavelength and longest wavelength becomes 65÷(e/2) when the residual dispersion at the shortest wavelength and longest wavelength of the operating wavelength band has become ±65 ps/nm and the bandwidth of the operating wavelength band is taken to be e.

Thus, the absolute value of the dispersion slope following dispersion compensation per optical fiber length in the entire transmission path shown in equation (4) is required to be equal to or less than the value obtained by dividing 65÷(e/2) by the optical fiber length of the entire transmission path, namely $\Sigma(Lt_i + Ld_i)$. This is the reason why it is preferable that c and d are set so as to satisfy equations (7) and (8).

In addition, it is also preferable that a and b satisfy the relationship of a>2c and b≤2d.

This is because, if dispersion is compensated in each transmission path span so that a and b satisfy this relationship, the residual dispersion following dispersion compensation can be held to a low level over the entire operating wavelength band for the entire transmission path by connecting these transmission path spans. In addition, by setting the relationships between a and c and between b and d in this manner, the change in residual compensation in each transmission span can be reduced, thereby enabling improvement of transmission characteristics.

In addition, by setting the relationships between a and c and between b and d in this manner, the dispersion characteristics of the dispersion compensating fibers used in each transmission path span can be made to be comparatively lenient, thereby allowing the yield of the dispersion compensating fibers to be improved.

Figure 2:
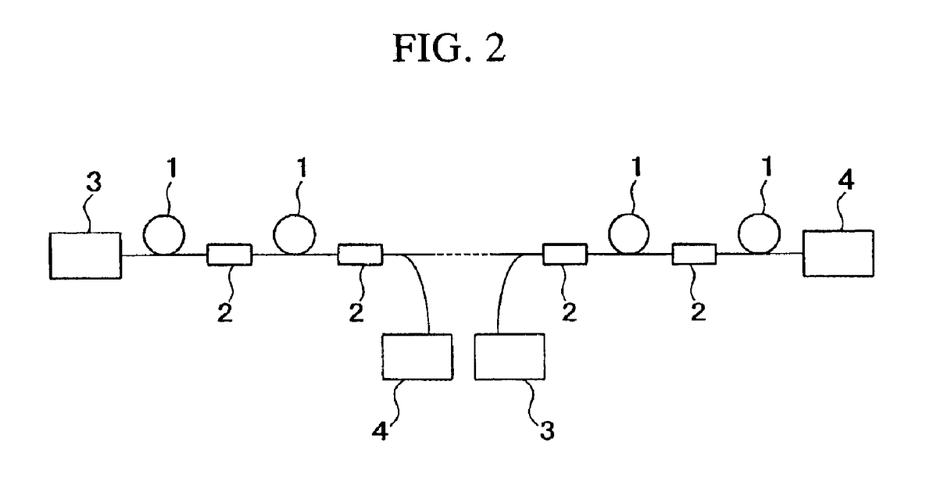
FIG. 2 is a drawing showing a second embodiment of the optical transmission system of the present invention.

FIG. 2 shows a second embodiment of the optical transmission system of the present invention.

In FIG. 2 as well, reference symbol 1 represents an optical fiber for transmission, and dispersion compensating fiber 2 is connected to every span of this optical fiber for transmission 1. One set of a transmission path span is formed by this optical fiber for transmission 1 and dispersion compensating fiber 2, and this one set of transmission path span is connected in multiple stages to form the entire optical transmission path.

In this embodiment as well, although the transmitter 3 and receiver 4 are connected to this optical transmission path to form an optical transmission system, in the optical transmission system of this embodiment, the optical signal is received with the receiver 4 by extracting the optical signal at an intermediate transmission path span, or the transmitter 3 is provided at an intermediate point, and the optical signal is sent out from this transmitter 3.

Consequently, the numerator of equation (1) in the form of $St_iLt_i+Sd_iLd_i$ preferably consists of alternating positive and negative values. In addition, in the case the value of $St_iLt_i+Sd_iLd_i$ is consecutively positive or negative, a dispersion compensating fiber is preferably arranged so that the value of the following $St_iLt_i+Sd_iLd_i$ has the opposite sign. As a result, the residual compensation at any arbitrary point of the optical transmission path can be reduced.

The above dispersion compensating fiber 2 has the refractive index profile shown, for example, in FIG. 3.

In FIG. 3, reference symbol 11 represents a central core section, reference symbol 12 represents an intermediate core section provided on the outer periphery of the central core section 11, reference symbol 13 represents a ring core section provided on the outer periphery of the intermediate core section 12, and reference symbol 14 represents a cladding provided on the outer periphery of the ring core section 13.

The ring core section 11 has a refractive index that is larger than the refractive index of the cladding 14, the intermediate core section 12 has a refractive index smaller than the refractive index of the cladding 14, and the ring core section 13 has a refractive index that is larger than the refractive index of the cladding 14.

As shown in FIG. 3, when the radius of the central core section 11 is taken to be a, the radius of the intermediate core section 12 is taken to be b, and the radius of the ring core section 13 is taken to be c, the dispersion compensating fiber is formed so that the ratio b/a of the intermediate core radius to the central core radius is from 2.5 to 4.0, the ratio b/c of the ring core radius to the intermediate core radius is from 1.1 to 2.0, and the ring core radius c is from 6 μm to 9 μm. In addition, the relative refractive index difference Δ1 of the central core section 11 with respect to the cladding 14 is from +1.2% to +1.7%, the relative refractive index difference Δ2 of the intermediate core section 12 with respect to the cladding 14 is from −0.20% to −0.45%, and the relative refractive index difference Δ3 of the ring core section 13 with respect to the cladding 14 is from +0.2% to +1.1%.

This dispersion compensating fiber 2 has an effective core cross-sectional area of 20 μm² or more in an operating wavelength band selected from, for example, 1.460 μm to 1.625 μm, the bending loss in the above operating wavelength band is 20 dB/m or less, and the wavelength dispersion in the above operating wavelength band is within the range of −65 ps/nm/km to −100 ps/nm/km, and has a cutoff wavelength that allows substantially allows single-mode propagation.

In this optical transmission system, the operating wavelength band is preferably arbitrarily selected from a wavelength range of 1460 nm to 1530 nm, a wavelength range of 1530 nm to 1565 nm, or a wavelength range of 1565 nm to 1625 nm.

According to the optical transmission system of this embodiment, in an optical transmission system having an optical transmission path composed by connecting a plurality of sets of transmission path spans composed of the optical fiber for transmission 1 having positive wavelength dispersion in the operating wavelength band, and the dispersion compensating fiber 2 having negative wavelength dispersion and negative dispersion slope in the operating wavelength band, by setting the conditions of dispersion compensation in each transmission path span comparatively leniently, managing the residual dispersion of each transmission span, and suitably arranging each transmission span, adequate dispersion compensation is performed for the entire optical transmission path, thereby making it possible to minimize residual dispersion following dispersion compensation over the entire operating wavelength band to within ±65 ps/nm while maintaining the yield of the dispersion compensating fiber, and realize an optical transmission system that enables high-speed transmission of 40 Gb/s or more.

Although the above embodiment has provided an explanation of an example of forming an optical transmission path by forming a dispersion compensating fiber into a cable, the optical transmission system in which dispersion is compensated using dispersion compensating fiber is not limited to this, but rather wavelength dispersion and dispersion slope can also be compensated by forming an optic module using dispersion compensating fiber and inserting this optic module into the receiver side or transmitter side of an existing optical transmission path.

The following indicates specific examples.

EXAMPLE 1

A dispersion compensating fiber having negative wavelength dispersion and negative dispersion slope was inserted into a single-mode optical fiber for transmission having positive wavelength dispersion and positive dispersion slope every 80 km to compensate wavelength dispersion of the optical transmission path over a wide wavelength range. The operating wavelength range here was 1530–1570 nm, and dispersion compensation was performed at 1550 nm corresponding to the central wavelength of this operating wavelength range.

The dispersion characteristics at each wavelength of the single-mode optical fiber are 15.8 ps/nm/km at 1530 nm, 17.0 ps/nm/km at 1550 nm, and 18.2 ps/nm/km at 1570 nm. In addition, as shown in Table 1, the dispersion compensating fiber used in each span had a residual dispersion error at the central wavelength of ±3.0% or less, the dispersion slope compensation ratio was within 100±30%, it satisfied equation (1) in each span, and the dispersion compensation conditions were set comparatively leniently.

TABLE 1

| No. | Insertion loss dB @ 1550 nm | Dispersion ps/nm @ 1550 nm | Dispersion error % @ 1550 nm (target value = −1360 ps/nm) | Dispersion slope ps/nm² @ 1550 nm | Dispersion slope compensation ratio % | Aeff μm² @ 1550 nm | PMD ps @ 1550 nm band |
|---|---|---|---|---|---|---|---|
| Module A | 5.98 | −1319 | −3.0 | −3.23 | 72 | 21.0 | 0.3 |

TABLE 1-continued

| No. | Insertion loss dB @ 1550 nm | Dispersion ps/nm @ 1550 nm | Dispersion error % @ 1550 nm (target value = −1360 ps/nm) | Dispersion slope ps/nm² @ 1550 nm | Dispersion slope compensation ratio % | Aeff μm² @ 1550 nm | PMD ps @ 1550 nm band |
|---|---|---|---|---|---|---|---|
| Module B | 5.88 | −1398 | +2.8 | −5.70 | 120 | 23.0 | 0.3 |
| Module C | 6.20 | −1333 | −2.0 | −3.63 | 80 | 21.0 | 0.2 |
| Module D | 6.10 | −1399 | +2.9 | −5.37 | 113 | 24.3 | 0.3 |
| Module E | 6.32 | −1326 | −2.5 | −3.43 | 76 | 21.6 | 0.3 |

As a result of compensating dispersion by inserting the dispersion compensating fiber of Table 1 into the single-mode optical fiber every 80 km starting in order from Module A, residual dispersion of −12 ps/nm remained at 1530 nm, +24 ps/nm at 1550 nm, and +60 ps/nm at 1570 nm.

In this manner, even though the dispersion compensation conditions of the dispersion compensating fiber used in this example in each span were set more leniently than the comparative example to be described later, since the dispersion compensation conditions of the entire transmission path were made to satisfy equations (4), (5), (7) and (8), the absolute value of maximum residual dispersion in the operating wavelength band was able to be +60 ps/nm, which is lower than the ±65 ps/nm that is the condition for residual dispersion required for high-speed transmission of 40 Gb/s or more. Consequently, further dispersion compensation was not necessary.

EXAMPLE 2

A dispersion compensating fiber having negative wavelength dispersion and negative dispersion slope was inserted into a single-mode optical fiber for transmission having positive wavelength dispersion and positive dispersion slope every 80 km to compensate wavelength dispersion of the optical transmission path over a wide range. The operating wavelength range here was 1530–1570 nm, and dispersion compensation was performed at 1550 nm corresponding to the central wavelength of this operating wavelength range.

The dispersion characteristics at each wavelength of the single-mode optical fiber are 15.8 ps/nm/km at 1530 nm, 17.0 ps/nm/km at 1550 nm, and 18.2 ps/nm/km at 1570 nm. In addition, as shown in Table 2, the dispersion compensating fiber used in each span had a residual dispersion error at the central wavelength of ±3.0% or less, the dispersion slope compensation ratio was within 100±30%, it satisfied equation (1) in each span, and the dispersion compensation conditions were set comparatively leniently.

TABLE 2

| No. | Insertion loss dB @ 1550 nm | Dispersion ps/nm @ 1550 nm | Dispersion error % @ 1550 nm (target value = −1360 ps/nm) | Dispersion slope ps/nm² @ 1550 nm | Dispersion slope compensation ratio % | Aeff μm² @ 1550 nm | PMD ps @ 1550 nm band |
|---|---|---|---|---|---|---|---|
| Module F | 5.98 | −1376 | +1.2 | −4.07 | 87 | 21.3 | 0.3 |
| Module G | 5.88 | −1398 | +2.8 | −4.14 | 87 | 22.8 | 0.4 |
| Module H | 6.20 | −1333 | −2.0 | −5.21 | 115 | 21.0 | 0.2 |
| Module I | 6.10 | −1386 | +1.9 | −5.32 | 113 | 22.6 | 0.3 |
| Module J | 6.32 | −1326 | −2.5 | −3.61 | 80 | 21.6 | 0.2 |

As a result of compensating dispersion by inserting the dispersion compensating fiber of Table 2 into the single-mode optical fiber every 80 km starting in order from Module F, residual dispersion of −36 ps/nm remained at 1530 nm, −19 ps/nm at 1550 nm, and −3.3 ps/nm at 1570 nm.

In this manner, even though the dispersion compensation conditions of the dispersion compensating fiber used in this example in each span were set more leniently than the comparative example to be described later, since the disper sion compensation conditions of the entire transmission path were made to satisfy equations (4), (5), (7) and (8), the absolute value of maximum residual dispersion in the operating wavelength band was able to be −36 ps/nm, which is lower than the ±65 ps/nm that is the condition for residual dispersion required for high-speed transmission of 40 Gb/s or more. Consequently, further dispersion compensation was not necessary.

In addition, even if modules having a dispersion slope compensation ratio of 100% or more and 100% or less are not alternately inserted into each transmission path span, large residual dispersion should not remain in intermediate transmission path spans, and modules may be inserted having characteristics that are the opposite of the dispersion compensation characteristics of the previous transmission path span relative to 100% compensation in the next transmission path span. For example, in the case of connecting modules having a dispersion slope compensation ratio of 100% or less as in this example, residual dispersion was able to be reduced by inserting a module having a dispersion slope compensation ratio of 100% or more in the next transmission path span.

EXAMPLE 3

A dispersion compensating fiber having negative wavelength dispersion and negative dispersion slope was inserted into a single-mode optical fiber for transmission having positive wavelength dispersion and positive dispersion slope every 80 km to compensate wavelength dispersion of the optical transmission path. The operating wavelength range here was 1530–1570 nm, and dispersion compensation was performed at 1550 nm corresponding to the central wavelength of this operating wavelength range.

The dispersion characteristics at each wavelength of the single-mode optical fiber are +3.6 ps/nm/km at 1530 nm, +4.5 ps/nm/km at 1550 nm, and +5.4 ps/nm/km at 1570 nm. In addition, as shown in Table 3, the dispersion compensating fiber used in each span had a residual dispersion error at the central wavelength of ±3.0% or less, the dispersion slope compensation ratio was within 100±30%, it satisfied equation (1) in each span, and the dispersion compensation conditions were set comparatively leniently.

As a result of compensating dispersion by inserting the dispersion compensating fiber of Table 3 into the single-mode optical fiber every 80 km starting in order from Module K, residual dispersion of +3 ps/nm remained at 1530 nm, −3 ps/nm at 1550 nm, and +10 ps/nm at 1570 nm.

In this manner, even though the dispersion compensation conditions of the dispersion compensating fiber used in this example in each span were set more leniently than the comparative example to be described later, since the dispersion compensation conditions of the entire transmission path were made to satisfy equations (4), (5), (7) and (8), the absolute value of maximum residual dispersion in the operating wavelength band was able to be +10 ps/nm, which is lower than the ±65 ps/nm that is the condition for residual dispersion required for high-speed transmission of 40 Gb/s or more. Consequently, further dispersion compensation was not necessary.

EXAMPLE 4

A dispersion compensating fiber having negative wavelength dispersion and negative dispersion slope was inserted into a single-mode optical fiber for transmission having positive wavelength dispersion and positive dispersion slope every 80 km to compensate wavelength dispersion of the optical transmission path over a wide range. The operating wavelength range here was 1570–1630 nm, and dispersion compensation was performed at 1600 nm corresponding to the central wavelength of this operating wavelength range.

The dispersion characteristics at each wavelength of the single-mode optical fiber are 17.4 ps/nm/km at 1570 nm, 19.0 ps/nm/km at 1600 nm, and 20.7 ps/nm/km at 1630 nm. In addition, as shown in Table 4, the dispersion compensating fiber used in each span had a residual dispersion error at the central wavelength of ±3.0% or less, the dispersion slope compensation ratio was within 100±30%, it satisfied equation (1) in each span, and the dispersion compensation conditions were set comparatively leniently.

TABLE 3

| No. | Insertion loss dB @ 1550 nm | Dispersion ps/nm @ 1550 nm | Dispersion error % @ 1550 nm (target value = −360 ps/nm) | Dispersion slope ps/nm$^2$ @ 1550 nm | Dispersion slope compensation ratio % | Aeff $\mu m^2$ @ 1550 nm | PMD ps @ 1550 nm band |
|---|---|---|---|---|---|---|---|
| Module K | 3.6 | −370 | +2.8 | −4.44 | 120 | 15.7 | 0.2 |
| Module L | 3.3 | −351 | −2.6 | −2.81 | 80 | 16.0 | 0.3 |
| Module M | 3.5 | −367 | +1.9 | −4.22 | 115 | 16.2 | 0.2 |
| Module N | 3.8 | −350 | −2.8 | −3.01 | 86 | 16.2 | 0.3 |
| Module O | 3.5 | −366 | +1.6 | −3.84 | 105 | 15.8 | 0.3 |

TABLE 4

| No. | Insertion loss dB @ 1600 nm | Dispersion ps/nm @ 1600 nm | Dispersion error % @ 1600 nm (target value = −1520 ps/nm) | Dispersion slope ps/nm² @ 1600 nm | Dispersion slope compensation ratio % | Aeff μm² @ 1600 nm | PMD ps @ 1600 nm band |
|---|---|---|---|---|---|---|---|
| Module P | 6.28 | −1563 | +2.8 | −5.44 | 120 | 22.0 | 0.3 |
| Module Q | 6.38 | −1480 | −2.6 | −3.43 | 80 | 21.0 | 0.3 |
| Module R | 6.30 | −1549 | +1.9 | −5.17 | 115 | 21.5 | 0.2 |
| Module S | 6.40 | −1477 | −2.8 | −3.68 | 86 | 20.3 | 0.3 |
| Module T | 5.52 | −1560 | +2.6 | −4.75 | 105 | 21.0 | 0.3 |

As a result of inserting the dispersion compensating fiber of Table 4 into the single-mode optical fiber every 80 km starting in order from Module P, residual dispersion of +5 ps/nm remained at 1570 nm, −29 ps/nm at 1600 nm, and −23 ps/nm at 1630 nm.

In this manner, even though the dispersion compensation conditions of the dispersion compensating fiber used in this example in each span were more lenient than the comparative example to be described later, since the dispersion compensation conditions of the entire transmission path were made to satisfy equations (4), (5), (7) and (8), the maximum residual dispersion in the operating wavelength band was able to be −29 ps/nm, which is lower than the ±65 ps/nm that is the condition for residual dispersion required for high-speed transmission of 40 Gb/s or more. Consequently, further dispersion compensation was not necessary.

COMPARATIVE EXAMPLE 1

A dispersion compensating fiber having negative wavelength dispersion and negative dispersion slope was inserted into a single-mode optical fiber for transmission having positive wavelength dispersion and positive dispersion slope every 80 km to compensate wavelength dispersion of the optical transmission path over a wide range. The operating wavelength range here was 1530–1570 nm, and dispersion compensation was performed at 1550 nm corresponding to the central wavelength of this operating wavelength range.

The dispersion characteristics at each wavelength of the single-mode optical fiber are 15.8 ps/nm/km at 1530 nm, 17.0 ps/nm/km at 1550 nm, and 18.2 ps/nm/km at 1570 nm. In addition, as shown in Table 5, the dispersion compensating fiber used in each span had a residual dispersion error at the central wavelength of 0.7%, the dispersion slope compensation ratio was within 100±10%, and the conditions with respect to dispersion compensation were more severe in comparison with Embodiments 1 through 4.

TABLE 5

| No. | Insertion loss dB @ 1550 nm | Dispersion ps/nm @ 1550 nm | Dispersion error % @ 1550 nm (target value = −1360 ps/nm) | Dispersion slope ps/nm² @ 1550 nm | Dispersion slope compensation ratio % | Aeff μm² @ 1550 nm | PMD ps @ 1550 nm band |
|---|---|---|---|---|---|---|---|
| Module U | 5.91 | −1350 | −0.7 | −4.22 | 92 | 21.7 | 0.3 |
| Module V | 5.85 | −1363 | −0.5 | −4.28 | 93 | 22.0 | 0.2 |
| Module W | 6.30 | −1358 | +0.1 | −4.16 | 90 | 21.2 | 0.3 |
| Module X | 6.60 | −1358 | −0.1 | −4.16 | 90 | 21.3 | 0.3 |
| Module Y | 6.06 | −1352 | −0.6 | −4.18 | 91 | 21.6 | 0.3 |

However, all of the dispersion compensating fibers used in this example had an amount of wavelength dispersion that was lower than the target dispersion, all of their dispersion slope compensation ratios were 100% or less, and were used by combining those having bias in their dispersion characteristics.

As a result of inserting the dispersion compensating fiber of Table 5 into the single-mode optical fiber every 80 km starting in order from Module U, residual dispersion of −19 ps/nm remained at 1530 nm, +24 ps/nm at 1550 nm, and +67 ps/nm at 1570 nm.

In this manner, the values of residual dispersion at the shortest wavelength band of 1530 nm and the longest wavelength band of 1570 nm of the operating wavelength band were not equal to or less than ±65 ps/nm, which is the condition for wavelength dispersion required for high-speed transmission of 40 Gb/s or more, and further dispersion compensation was required in the vicinity of the wavelengths at both ends of the operating wavelength band.

In this example, the reason for the increase in residual dispersion throughout the entire transmission path is because, although the dispersion compensating fiber used in this example had dispersion compensation conditions for each span that adequately satisfied equation (1), due to the bias in the dispersion compensation, the dispersion compensation conditions of the entire transmission path did not satisfy equations (4), (5), (7) and (8).

On the basis of the above results, when the dispersion compensating fiber is used for which the conditions of dispersion compensation in each transmission path span have been set comparatively leniently to an extent that satisfies equation (1), as a result of using the dispersion compensating fiber for which the conditions of dispersion compensation with respect to the entire optical transmission path when a plurality of these dispersion compensating fibers are combined satisfy equations (4), (5), (7) and (8), it was clearly demonstrated that there is no significant deterioration of yield of the dispersion compensating fiber, and adequate dispersion compensation can be obtained for the entire optical transmission path.

What is claimed is:

1. An optical transmission system having an optical transmission path comprising:

a plurality, n, of connected sets of transmission path spans each formed of an optical fiber for transmission having positive wavelength dispersion and positive dispersion slope, and a dispersion compensating fiber having negative wavelength dispersion and negative dispersion slope, in an operating wavelength band; wherein, the dispersion slope and optical fiber length of the optical fiber for transmission and the dispersion compensating fiber satisfy equations (1), (2) and (3) for each transmission path span:

$$a \leq \frac{(St_i Lt_i) + (Sd_i Ld_i)}{(Lt_i + Ld_i)} \leq b \quad (1)$$

$$a \neq 0 \quad (2)$$

$$b \neq 0 \quad (3)$$

and satisfy equations (4) and (5) for the overall optical transmission path:

$$c \leq \frac{\sum_{i=1}^{n} St_i Lt_i + \sum_{i=1}^{n} Sd_i Ld_i}{\sum_{i=1}^{n} (Lt_i + Ld_i)} \leq d \quad (4)$$

$$c > a, d < b \quad (5)$$

wherein in equations (1), (2), (3), (4) and (5), $St_i$ and $Lt_i$ respectively represent the dispersion slope and optical fiber length of the optical fiber for transmission in each transmission path span, $Sd_i$ and $Ld_i$ respectively represent the dispersion slope and optical fiber length of the dispersion compensating fiber in each transmission path span, and a, b, c and d are constants that define the residual dispersion slope.

2. An optical transmission system according to claim 1 wherein, the value of equation (6) for said optical transmission path is formed by the combination of a transmission path span adopting a positive value and a transmission path span adopting a negative value $$\frac{(St_i \cdot Lt_i) + (Sd_i \cdot Ld_i)}{(Lt_i + Ld_i)} \quad (6)$$

wherein in equation (6), $St_i$ and $Lt_i$ respectively represent the dispersion slope and optical fiber length of the optical fiber for transmission in each transmission path span, and $Sd_i$ and $Ld_i$ respectively represent the dispersion slope and optical fiber length of the dispersion compensating fiber in each transmission path span.

3. An optical transmission system according to claim 1 wherein, the value of equation (6) for said optical transmission path is formed by alternately connecting a transmission path span that adopts a positive value and a transmission path span that adopts a negative value $$\frac{(St_i \cdot Lt_i) + (Sd_i \cdot Ld_i)}{(Lt_i + Ld_i)} \quad (6)$$

wherein in equation (6), $St_i$ and $Lt_i$ respectively represent the dispersion slope and optical fiber length of the optical fiber for transmission in each transmission path span, and $Sd_i$ and $Ld_i$ respectively represent the dispersion slope and optical fiber length of the dispersion compensating fiber in each transmission path span.

4. An optical transmission system according to claim 1 having an optical transmission path comprising:

at least two or more sets of transmission path spans each formed of an optical fiber for transmission having positive wavelength dispersion and positive dispersion slope, and a dispersion compensating fiber having negative wavelength dispersion and negative dispersion slope, in an operating wavelength band; wherein, the value of equation (6) is formed from at least one transmission path span having a positive value and at least one transmission path span having a negative value $$\frac{(St_i \cdot Lt_i) + (Sd_i \cdot Ld_i)}{(Lt_i + Ld_i)} \quad (6)$$

wherein in equation (6), $St_i$ and $Lt_i$ respectively represent the dispersion slope and optical fiber length of the optical fiber for transmission in each transmission path span, and $Sd_i$ and $Ld_i$ respectively represent the dispersion slope and optical fiber length of the dispersion compensating fiber in each transmission path span.

5. An optical transmission system according to claim 1 that further satisfies equations (7) and (8) with respect to a bandwidth e of said operating wavelength band:

$$c \geq -\frac{65}{(e/2)\sum_{i=1}^{n}(Lt_i + Ld_i)} \quad (7)$$

$$d \le \frac{65}{(e/2)\sum_{i=1}^{n}(Lt_i + Ld_i)} \tag{8}$$

wherein in equations (7) and (8), $Lt_i$ represents the optical fiber length of the optical fiber for transmission in each transmission path span, and $Ld_i$ represents the optical fiber length of the dispersion compensating fiber in each transmission path span.

6. An optical transmission system according to claim 5 wherein $a \ge 2c$ and $b \le 2d$.

7. An optical system according to claim 6 wherein, said dispersion compensating fiber is incorporated as an optical cable.

8. An optical transmission system according to claim 6 wherein, said dispersion compensating fiber is incorporated as an optical fiber module.

9. An optical transmission system according to claim 6 wherein each said dispersion compensating fiber comprises a separate dispersion compensating fiber module, and the dispersion compensating fiber modules are used as a set to satisfy the conditions of claim 1.

10. An optical transmission system according to claim 5 wherein, said dispersion compensating fiber is incorporated as an optical cable.

11. An optical transmission system according to claim 5 wherein, said dispersion compensating fiber is incorporated as an optical fiber module.

12. An optical transmission system according to claim 5 wherein each said dispersion compensating fiber comprises a separate dispersion compensating fiber module, and the dispersion compensating fiber modules are used as a set to satisfy the conditions of claim 1.

13. An optical transmission system according to claim 1 wherein, $a \ge 2c$ and $b \le 2d$.

14. An optical transmission system according to claim 13 wherein, said dispersion compensating fiber is incorporated as an optical cable.

15. An optical transmission system according to claim 13 wherein, said dispersion compensating fiber is incorporated as an optical fiber module.

16. An optical transmission system according to claim 13 wherein each said dispersion compensating fiber comprises a separate dispersion compensating fiber module, and the dispersion compensating fiber modules are used as a set to satisfy the conditions of claim 1.

17. An optical transmission system according to claim 1 wherein, said dispersion compensating fiber is incorporated as an optical cable.

18. An optical transmission system according to claim 1 wherein, said dispersion compensating fiber is incorporated as an optical fiber module.

19. An optical transmission system according to claim 1 wherein each said dispersion compensating fiber comprises a separate dispersion-compensating fiber module, and the dispersion compensating fiber modules are used as a set to satisfy the conditions of claim 1.

20. An optical transmission system according to claim 1 wherein, said operating wavelength band is a wavelength range selected from a wavelength range of 1460 nm to 1530 nm.

21. An optical transmission system according to claim 1 wherein, said operating wavelength band is a wavelength range selected from a wavelength range of 1530 nm to 1565 nm.

22. An optical transmission system according to claim 1 wherein, said operating wavelength band is a wavelength range selected from a wavelength range of 1565 nm to 1625 nm.

23. An optical transmission system according to claim 1 wherein, the residual dispersion compensation in said operating wavelength band is held to within ±65 ps/nm.

24. An optical transmission system according to claim 1 comprising: a core having a cladding on its outer periphery, said core comprising a central core section having a refractive index at least larger than the refractive index of the cladding, an intermediate core section provided on the outer periphery of this central core section and having a refractive index smaller than the refractive index of the cladding, and a ring core section provided on the outer periphery of this intermediate core section and having a refractive index larger than the refractive index of the cladding; wherein, the radius of the ring core section is from 6 $\mu$m to 9 $\mu$m, the ratio of the radius of the intermediate core section to the radius of the central core section is from 2.5 to 4.0, and the ratio of the radius of the ring core section to the radius of the intermediate core section is from 1.1 to 2.0, the relative refractive index difference of the central core section with respect to the cladding is from +1.2% to +1.7%, the relative refractive index difference of the intermediate core section with respect to the cladding is from −0.20% to −0.45%, and the relative refractive index difference of the ring core section with respect to the cladding is from +0.2% to +1.1%, and, the effective area in the operating wavelength band selected from 1.460 $\mu$m to 1.625 $\mu$m is 20 $\mu$m$^2$ or more, the bending loss in said operating wavelength band is 20 dB/m or less, the wavelength dispersion in said operating wavelength band is in the range of −65 ps/nm/km to −100 ps/nm/km, and an optical fiber having a cutoff wavelength capable of single-mode transmission in said operating wavelength band and in the substantial operating state is used as said dispersion compensating fiber.

25. A transmission path span for use in an optical transmission path of an optical transmission system comprising:

an optical fiber for transmission having positive wavelength dispersion and positive dispersion slope, and a dispersion compensating fiber having negative wavelength dispersion and negative dispersion slope, in an operating wavelength band; wherein, the dispersion slope and optical fiber length of the optical fiber for transmission and the dispersion compensating fiber satisfy equations (1), (2) and (3) for each transmission path span:

$$a \le \frac{(St_i Lt_i) + (Sd_i Ld_i)}{(Lt_i + Ld_i)} \le b \tag{1}$$

$$a \ne 0 \tag{2}$$

$$b \ne 0 \tag{3}$$

and satisfy equations (4) and (5) for the overall optical transmission path:

$$c \le \frac{\sum_{i=1}^{n} St_i Lt_i + \sum_{i=1}^{n} Sd_i Ld_i}{\sum_{i=1}^{n}(Lt_i + Ld_i)} \le d \tag{4}$$

$$c > a, d < b \tag{5}$$

wherein in equations (1), (2), (3), (4) and (5), $St_i$ and $Lt_i$ respectively represent the dispersion slope and optical fiber length of the optical fiber for transmission in each transmission path span, $Sd_i$ and $Ld_i$ respectively represent the dispersion slope and optical fiber length of the dispersion compensating fiber in each transmission path span, and a, b, c and d are constants that define the residual dispersion slope.

26. The transmission path span as claimed in claim 25 comprising:

a core having a cladding on its outer periphery, said core comprising a central core section having a refractive index at least larger than the refractive index of the cladding, an intermediate core section provided on the outer periphery of said central core section and having a refractive index smaller than the refractive index of said cladding, and a ring core section provided on the outer periphery of said intermediate core section and having a refractive index larger than the refractive index of said cladding; wherein, the radius of said ring core section is from 6 μm to 9 μm, the ratio of the radius of said intermediate core section to the radius of said central core section is from 2.5 to 4.0, and the ratio of the radius of the ring core section to the radius of the intermediate core section is from 1.1 to 2.0, the relative refractive index difference of the central core section with respect to the cladding is from +1.2% to +1.7%, the relative refractive index difference of the intermediate core section with respect to the cladding is from −0.20% to −0.45%, and the relative refractive index difference of the ring core section with respect to the cladding is from +0.2% to +1.1%, and, the effective area in the operating wavelength band selected from 1.460 μm to 1.625 μm is 20 μm² or more, the bending loss in said operating wavelength band is 20 dB/m or less, the wavelength dispersion in said operating wavelength band is in the range of −65 ps/nm/km to −100 ps/nm/km, and an optical fiber having a cutoff wavelength capable of single-mode transmission in said operating wavelength band and in the substantial operating state is used as said dispersion compensating fiber.

* * * * *